(12) United States Patent
Tangorra et al.

(10) Patent No.: US 6,760,602 B2
(45) Date of Patent: Jul. 6, 2004

(54) MOBILE COMMUNICATION SYSTEM WITH IMPROVED BASE STATION CONTROL

(75) Inventors: Philip P. Tangorra, West Dundee, IL (US); Christopher R. Schmidt, Wheaton, IL (US)

(73) Assignee: Motorola, Inc., Schaumburg, IL (US)

( * ) Notice: Subject to any disclaimer, the term of this patent is extended or adjusted under 35 U.S.C. 154(b) by 594 days.

(21) Appl. No.: 09/741,984

(22) Filed: Dec. 22, 2000

(65) Prior Publication Data

US 2002/0082051 A1 Jun. 27, 2002

(51) Int. Cl.[7] .............................. H04B 1/38; H04M 1/00; H04Q 7/20; H04J 3/22
(52) U.S. Cl. ................. 455/561; 455/456.5; 455/456.6; 455/550.1; 455/552.1; 370/466; 370/468
(58) Field of Search .................... 455/435.1, 435.2, 455/452.1, 452.2, 433, 454, 455, 456.5, 456.6, 414.1, 575, 422.1, 423, 424, 425, 414.4; 370/352, 338, 401, 468, 466, 465, 467

(56) References Cited

U.S. PATENT DOCUMENTS

| | | | |
|---|---|---|---|
| 5,321,737 A | 6/1994 | Patsiokas | |
| 5,345,597 A | 9/1994 | Strawczynski et al. | |
| 5,613,213 A | 3/1997 | Naddell et al. | |
| 5,638,412 A * | 6/1997 | Blakeney, II et al. | 375/377 |
| 5,664,004 A | 9/1997 | Durchman et al. | |
| 5,818,871 A | 10/1998 | Blakeney et al. | |
| 5,850,391 A | 12/1998 | Essigmann | |
| 5,940,757 A | 8/1999 | Callaway, Jr. | |
| 6,047,071 A | 4/2000 | Shah | |
| 6,122,518 A * | 9/2000 | Suda | 455/450 |
| 6,148,198 A | 11/2000 | Anderson et al. | |
| 6,178,326 B1 * | 1/2001 | Kalliokulju | 455/437 |
| 6,188,892 B1 * | 2/2001 | Krishnamurthi et al. | 455/422 |
| 6,188,897 B1 * | 2/2001 | Nelson | 455/432 |
| 6,198,929 B1 * | 3/2001 | Krishnamurthi et al. | 455/439 |
| 6,449,488 B1 * | 9/2002 | Cheng et al. | 455/466 |
| 6,452,911 B1 * | 9/2002 | Seo | 370/335 |
| 6,606,311 B1 * | 8/2003 | Wang et al. | 370/338 |
| 6,621,809 B1 * | 9/2003 | Lee et al. | 370/335 |

FOREIGN PATENT DOCUMENTS

| | | |
|---|---|---|
| GB | 2 320 653 A | 6/1998 |
| WO | WO 95/07010 A1 | 3/1995 |

* cited by examiner

Primary Examiner—William Trost
Assistant Examiner—Meless Zewdu

(57) ABSTRACT

Method and apparatus for toggling service options after completion of call setup, is disclosed for use in a wireless communication system. A service option preferred by the base station (30, 32) or other portion of the system infrastructure is compared to service option capabilities of the mobile station (26) requesting service. If the mobile station (26) is capable of accommodating the service option preferred by the base station (30, 32), a service connect message (64) is sent to the mobile station (26) to initiate toggling of the service option.

18 Claims, 4 Drawing Sheets

MOBILE COMMUNICATION SYSTEM WITH IMPROVED BASE STATION CONTROL

BACKGROUND OF THE INVENTION

The present invention pertains to improved service in mobile communication systems, and more particularly to service changes carried out under base station control to implement a base station's preferred service option assignment.

In current wireless communication systems, a mobile station and its supporting infrastructure equipment are able to negotiate with one another to reach a particular service configuration. This process is typically referred to as a service negotiation procedure. Such negotiation is necessary, for example, because a mobile station may request certain services which are not supported by the base station or other infrastructure equipment. To implement the service negotiation procedure, the services are assigned service options, and within the infrastructure equipment, a plurality of different transcoders may be associated with different service options. When communication between the base station and the mobile stations is established, only one type of transcoder within the infrastructure equipment is assigned to the particular combination. If, during the communication, the mobile station requests a different type of service to be implemented, a new service negotiation procedure is implemented to fulfill the request.

However, a commercially significant problem arises when the base station or other infrastructure equipment is not efficiently used. For example, less efficient service options are often invoked by mobile stations which are pre-programmed to request a lesser service option which is more likely to be accommodated by the largest number of base stations likely to be encountered. Thus, a need exists for more efficient service option procedures and the equipment for carrying out such procedures. It would be desirable to provide base stations of mobile communication systems with improved control after call setup so as to move the mobile subscriber to a service option pre-determinedly preferred by the base station, while the call is in a steady/conversation state.

DETAILED DESCRIPTION OF THE PREFERRED EMBODIMENTS

Generally, in radio mobile communication or cellular phone systems, the phone is programmed with setup or service options. The phone will have a preferred or default service option that may not be the most efficient in terms of providing high quality call connections and high volume call throughputs in the system, but will be the most reliable in terms of its breadth of use among different systems. In this manner, the mobile's preferred option is most likely to be accepted by the greatest number of base stations thus minimizing call setup delays due to service negotiations procedures between the mobile phone unit and the base stations. On the other hand, the base station will have a preferred service option based on different considerations or criteria related not to breadth of its use, but rather to more local conditions that affect service performance such as the system infrastructure or the local topography and densities of structures that may impact signal characteristics such as strength and clarity.

Accordingly, once a call setup is established, the preferred base station service option would be desired in terms of customer satisfaction over the more standard preferred service option of the mobile phone unit, if it were known that the phone unit was programmed so as to be compatible with the preferred service option of the base station. For call setup purposes, the preferred service option of the phone unit is more desirable in that it minimizes delay in call setup procedures, as discussed. Thus, the described embodiments are directed to a system that implements the base station preferred service option when possible with the phone unit so as to maximize service performance during radio communications, i.e. phone calls, while implementing the phone unit service option at the time a call is placed so as to minimize the delay in setting up a call between the phone and the infrastructure. In this manner, the system herein takes advantage of both the broad use of the more standard phone unit preferred service option during call set negotiation procedures and, after the call is setup, the enhanced performance provided by the base unit preferred service option. Further, efficient call setup and maximized service performance is achieved seamlessly without interruptions or delays apparent to the mobile station user.

Figure 1:
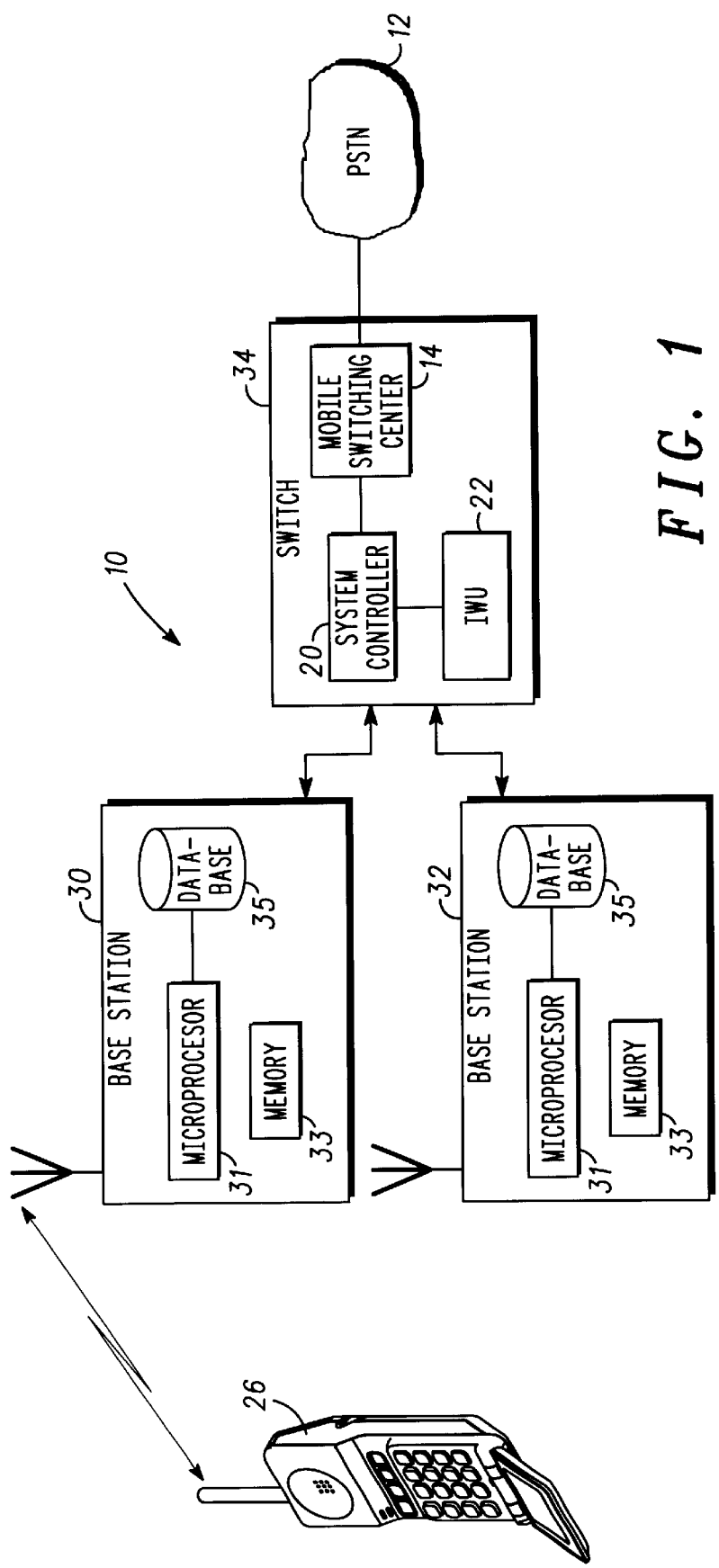
FIG. 1 is a schematic diagram of a communication system according to principles of the present invention.

Referring now to the figures, and initially to FIG. 1, a wireless mobile communication system is generally indicated at 10. Included in the system is a public switched telephone network (PSTN) 12 coupled to a Mobile Switching Center (MSC) 14 which provides wireline switching capability. Preferably, the communication system 10 supports Code Division Multiple Access (CDMA) radio telephone operation, although other types of operation, such as Time Division Multiple Access (TDMA), may be employed with the present invention.

A system controller 20 includes apparatus for providing synchronization during transcoder switching. An Interworking Unit (IWU) 22 handles data communications to and from a mobile station 26 traveling within the service area of communication system 10. The controller 20 also provides information processing and manages the routing of signals between multiple base stations, herein shown as base stations 30, 32 which have designated responsibility for communicating with mobile station 26 based on signal strength therebetween. Each base station 30, 32 has an information processor (MP 31), memory 33, and a database (dB 35). A cellular operator switch 34 provides facilities coupled with the base stations 30, 32. Together, the mobile switching center 14, the system controller 20, the base stations 30, 32 and the interworking unit 22 comprise the infrastructure equipment portion of the communication system 10. It will be readily appreciated that the various functions of the infrastructure components described herein may be combined or re-assigned so as to differ from the discrete representation of functions illustrated in FIG. 1. For example, the base stations can be provided with certain portions of the system controller functionality, and such is contemplated by the present invention.

As an example of system options under control in the described embodiments, mobile station 26 may be pre-programmed to request a 13K voice service option which is widely supported among various communication systems and which is likely to be quickly accepted whenever a call is placed to a nearby base station. Equipment contained in the mobile station 26 is usually constructed to accommodate other, less widely accepted but more efficient service options, such as 8K Enhanced Variable Rate Coding (EVRC) operation. Typically, mobile stations are not programmed to request less widely accepted service options because, for example, it is not desired to prolong service negotiations which delay call setup and, in certain circumstances, increase the likelihood that communication with the base stations may become lost.

Figure 2:
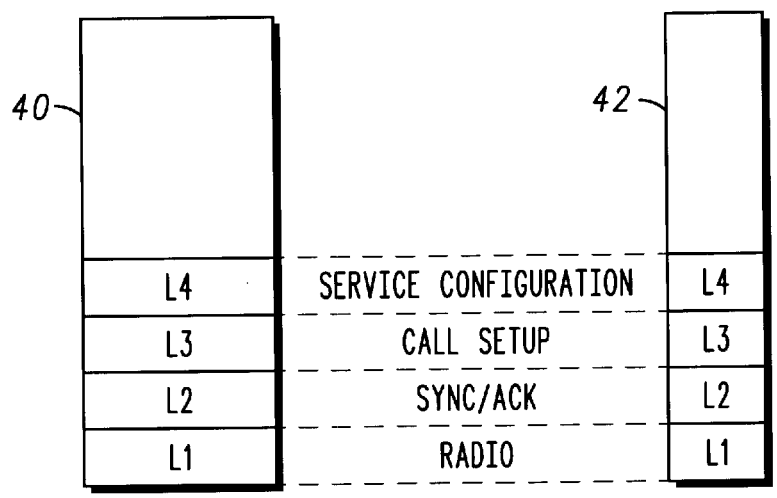
FIG. 2 is a schematic diagram showing signal layers implemented between base stations and mobile stations within the communication system of FIG. 1.

FIG. 2 shows signaling layers implemented in software operable with an information processor 31 from memory 33 between the base stations 30, 32 and mobile station 26. The call setup software provides two identical signaling layers 40, 42 are shown in FIG. 2. The signaling layer 40 is associated with the base stations 30, 32 whereas the signaling layer 42 is associated with mobile station 26. As schematically indicated in FIG. 2, the layer (L1) is assigned responsibility for air-interface signaling dedicated to a radio link between mobile and fixed equipment. A database 35 accessible with the base stations 30, 32 provides capabilities for connection messages to the mobile station 26. Messaging associated with the radio link, for example, is associated with layer L1. The layer L2 is provided for synchronization and acknowledgment between mobile and fixed stations. Layer L3 contains messaging associated with the implementation of call setup and layer L4 is associated with toggling or reconfiguring the service option operating mode of the mobile station. Layer L4 is the one which carries out modification of the service option after call setup has been completed, that is, during a steady conversation state. Layers L3 and L4 can be combined, if desired, so as to operate on a single data channel. It should be understood that the layers indicated in FIG. 2 apply to the various call types (e.g., voice, data, fax) accommodated by the communication system.

According to principles discussed herein, once service is negotiated between mobile station 26 and base stations 30 or 32, the base station 30 or 32 initiates operation to move the mobile station from one service option to another, which is preferred by the base station operator for reasons of efficiency. Thus, a call can be toggled from the initially requested service option to a preferred service option (i.e., preferred by the base station operator) after the call reaches a steady/conversation state, without requiring user intervention and without noticeable impact to the subscriber.

Figure 3:
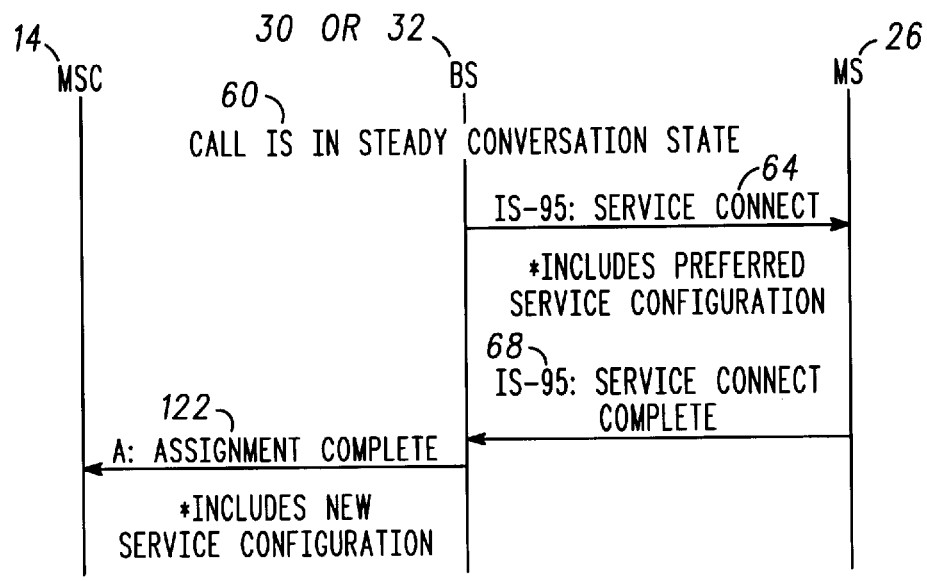
FIG. 3 is a diagram showing the messages exchanged to improve service efficiencies after call setup.
Figure 4:
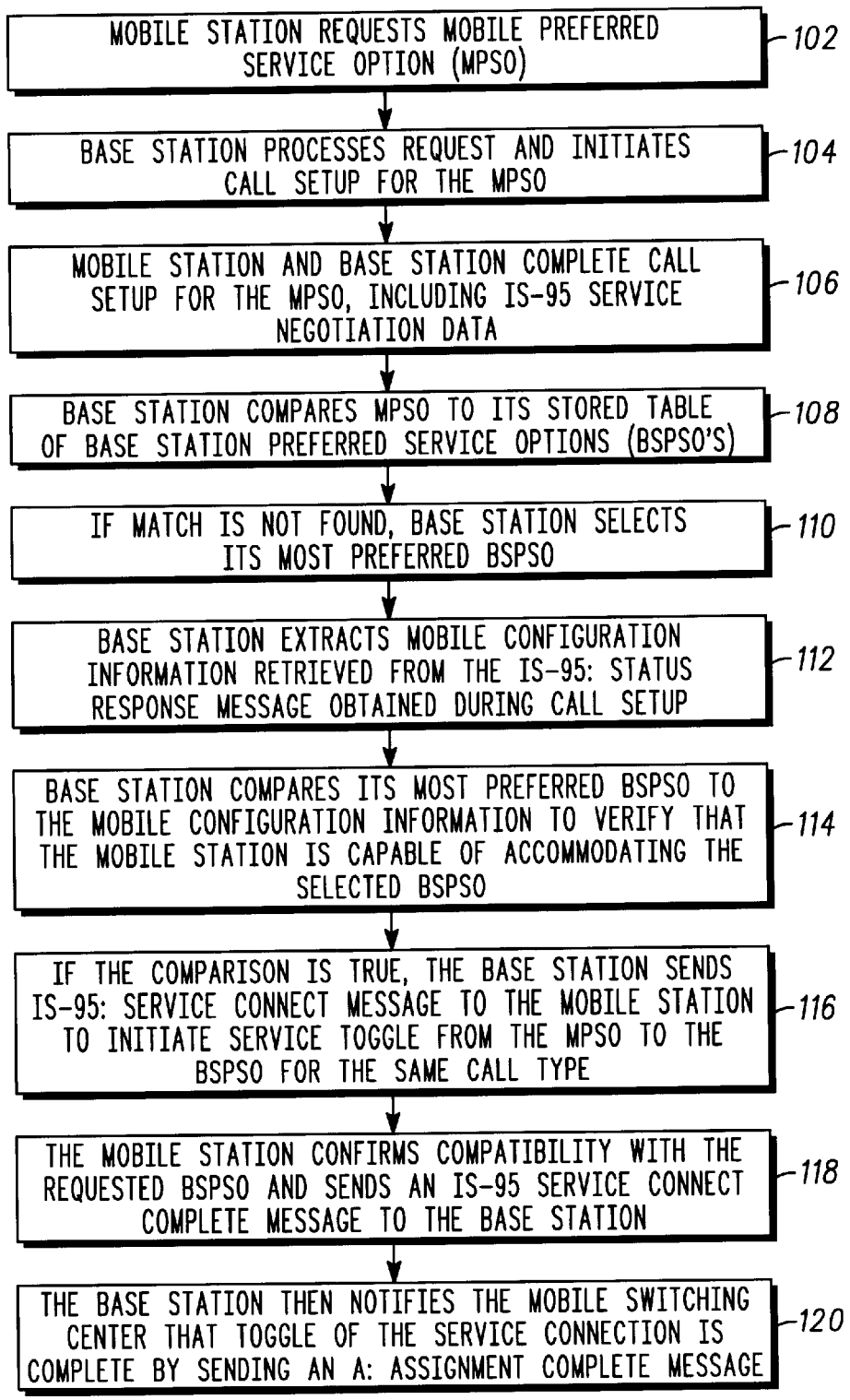
FIGS. 4 and 5 are schematic diagrams showing steps taken to achieve improved service between a base station and a mobile station.

Referring now to FIGS. 3 and 4, the preferred method of toggling service option assignments between base and mobile stations after establishment of call setup is described. FIG. 3 shows a messaging diagram and FIG. 4 shows an accompanying flow diagram setting forth the operational steps involved. In brief summary, the mobile station 26 is allowed to request its preferred service option, herein, a Mobile Preferred Service Option (MPSO) and to pursue call setup, and service negotiation as required, in a conventional, unimpeded manner, in order to quickly establish the call. After call setup is established, the base station 30 or 32 initiates toggling of the service option to achieve operation according to a pre-defined Base Station Preferred Service Option (BSPSO). It is preferred in the described embodiment that conventional, previously established Service Configuration Toggle procedures are employed to direct the mobile station to the service option preferred by the base station.

Referring now to FIG. 4, the mobile station 26 requests a service option from the infrastructure in step 102. Usually, the service option requested is pre-defined in the mobile station at the time of manufacture or activation. As mentioned, the service option requested by the mobile station 26 is usually selected to be that most widely acceptable by the greatest number of base stations which are likely to be encountered in the mobile station's area of use. As pointed out, this service option may not be the most efficient for overall operation and may not provide the best or most reliable service to the customer. Operators of the local infrastructure are aware of local conditions and typically study service performance in their operating area. Based upon this information and being aware of the various service options available in the infrastructure, system operators define one or more service options preferred by the base station, herein referred to as the Base Station Preferred Service Options (BSPSO).

In block 104, the request for service option is received by a base station and is processed in a conventional manner to initiate call setup for the MPSO without challenging the choice of service options preferred by the mobile station. The call setup procedure is carried out in block 106 in a conventional manner, including the reception of IS-95: Service Negotiation data. Herein, the IS-95 standard is referred to in the implementation of the present invention, although it will be recognized that other standards, such as the recent IS-2000 standard, could also be employed. Completion of call setup between the mobile station and a base station (and accompanying infrastructure) is, according to one aspect of the present invention, pursued as quickly as possible in a conventional manner. With reference to FIGS. 3 and 4, toggling of service option assignment begins after call setup is complete, while the call is in a steady/conversation state as indicated at 60 in FIG. 3 and as indicated in FIG. 4 following step 106.

After call setup is established, the infrastructure compares the MPSO to the service option preferred by the base station. The described embodiment contemplates that service toggling procedures could be carried out at virtually any point within the infrastructure. The block diagram of the infrastructure shown in FIG. 1, as mentioned, is simplified and, to some extent, arbitrary in associating various functionality to the various blocks shown in the diagram. It should be understood that functionality of the infrastructure discussed herein is given for explanatory purposes, and in various practical systems the functionality may be dispersed among various elements as may be identified in a block diagram.

As contemplated by the preferred embodiment, one or more BSPSOs are stored in memory in the base stations. This can be accomplished with direct intervention of equipment located in the base station or may be transmitted to the base station by other portions of the infrastructure, such as the system controller 20. In a more elaborate system, a hierarchical table to BSPSOs is stored for service option toggling purposes. Referring to block 108 in FIG. 4, the base station assigned responsibility for call setup compares the MPSO to its stored look-up table of BSPSOs. In the unlikely event that a match is found, no further intervention is required and no further service option toggling steps are carried out (unless required, for example, to respond to customer requests or to remedy a possible error condition requiring a change in the service option).

Referring to block 110, in the more likely event that a match between MPSO and BSPSO is not found, the base station 30, 32 selects the BSPSO to be invoked. In a more complex system, the base station 30, 32, steps through the stored hierarchical list of BSPSOs as required. In step 110 with no previous operational history associated with the call setup, the most preferred BSPSO is selected by the base station and control is then passed to block 112. During call setup, IS-95 Service Negotiation Data is acquired, and included among this data is the service option capability of the mobile station, data which is conventionally available according to IS-95 standards. Where the described embodiment is employed for use with service operations not according to IS-95 standards, it is necessary that the base station obtain from the mobile station its service option capabilities.

In block 114 the base station compares its initial selection of BSPSO to the mobile service option capabilities to verify that the mobile station is capable of accommodating the currently selected BSPSO. If the comparison fails, control is then transferred to FIG. 5, as will be described below.

Turning now to step 116 in FIG. 4, the base station has verified that the mobile station is capable of implementing the currently selected BSPSO, and steps are taken to toggle the service option. As indicated by message 64 in FIG. 3 and in block 116, the base station sends an IS-95: Service Connect message to the mobile station to initiate service toggle from the MPSO to the BSPSO. According to one aspect of the present invention, the call type (e.g., fax, modem or voice) is maintained the same throughout the service option toggling procedures as that initially requested by the mobile station. In block 118 in FIG. 4 and in message 68 in FIG. 3, the mobile station receives the IS-95: Service Connect message directed to the BSPSO selected by the base station, confirming compatibility with the requested service option, in a conventional manner. In the preferred embodiment, a responsive IS-95: Service Connect Complete message is sent to the base station. The base station then alerts other portions of the infrastructure, such as the mobile switching center 14, that the toggled service connection is completed. In the example given, the system controller 20 assigned responsibility for call setup sends a conventional A:Assignment Complete message to the mobile switching center 14. This is indicated in block 120 in FIG. 4 and message 122 in FIG. 3.

Figure 5:
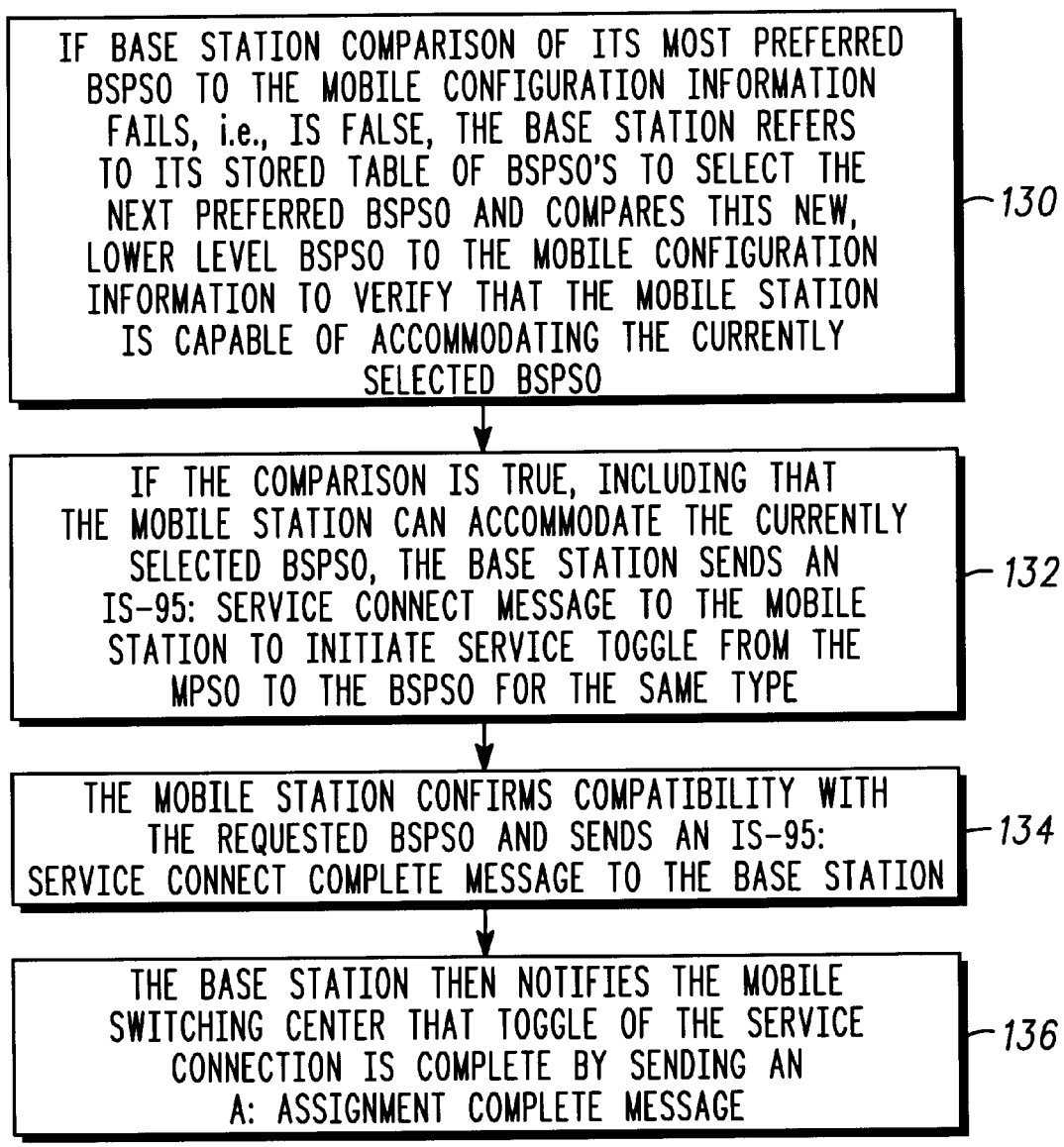

Referring to FIG. 5, it is possible that the comparison of the BSPSO to the service option capabilities of the mobile station (see block 114 in FIG. 4) fails, with a FALSE comparison result. While the BSPSOs are defined so as to accommodate a large number of mobile stations, it is possible that the mobile station requesting service cannot accommodate the highest or most preferred service option as defined by operators of the infrastructure or other individuals charged with oversight of system operations. For this reason, it is preferred that more than one BSPSO be identified and stored at the base station. It is further preferred that the multiple BSPSOs be arranged in a hierarchical table, according to their order of preference by the station operator.

With control transferred to block 130, the base station steps through its list of BSPSOs and selects the next most preferred BSPSO. This new, currently selected lower level BSPSO is compared to the service options supported by the mobile station to verify that the mobile station 26 is capable of accommodating the currently selected BSPSO. If the comparison result is FALSE then the procedures indicated in block 130 are repeated with the base station 30, 32 stepping through its hierarchical list of BSPSOs, until an acceptable BSPSO is identified.

When a BSPSO acceptable to the mobile station is identified, control is transferred to block 132 and procedures similar to those described above with respect to block 116 are carried out. Blocks 134 and 146 are identical to blocks 118 and 120 described above with reference to FIG. 4, except that the BSPSO is taken from a lower position in the hierarchical list stored in the database in the base station.

As mentioned above, the hierarchical list of BSPSOs can be transmitted under software control from system controller 20 (or other portions of the infrastructure) to the base stations 30, 32. Occurrences of operation according to FIG. 5 can be transmitted to the system controller 20 for analysis and, if necessary, a new hierarchical list of BSPSOs can be defined for transmission to the various base stations selected by the system controller. In this manner, the system controller can re-instruct a base station to initiate operation with a new table of BSPSOs and, if desired, this can be implemented in software without requiring human operator intervention.

By way of example, other supervisory functions can be carried out in a similar manner. For example, the hierarchy of BSPSOs for a given base station may be made to change from one time of day to another to accommodate differing atmospheric conditions. It will be appreciated that call toggling procedures according to principles of the present invention can provide highly flexible system operation providing numerous advantages, including improved efficiencies for overall system operations and improved customer satisfaction.

It can now be seen that the present invention provides a method of toggling the service option assignments between base and mobile stations after establishment of call setup, in which the mobile station requests the infrastructure to set up an MPSO. At least one BSPSO is stored in the system, preferably the base station. The MPSO is compared to the BSPSO, and a comparison is preferably carried out in one of the base stations. Upon determination of a FALSE, non-identical result, several steps are performed while the call is in a steady/conversation state. For example, a comparison is carried out at the base station to confirm that the mobile station is capable of service according to the BSPSO. Assuming a positive result, a service connection message sent from the base station is responded to with a message from the mobile station indicating that service connection according to the BSPSO is complete. Thereafter, the base station and the mobile station communicate with one another in accordance with the toggling of service option assignment which implements the BSPSO. As a further, optional step, the base station notifies the remainder of the infrastructure of the toggling of service option assignment. Throughout the toggling procedure, the same call type (e.g., voice, fax, data) is maintained. If data comparison indicates that the mobile station is not capable of service according to the BSPSO, a second BSPSO is retrieved from storage in the base station and the toggling steps indicated above are carried out with the currently selected BSPSO.

A system is also provided by the present invention to toggle the service option assignments between base and mobile stations in response to a call setup being established between the base and mobile stations in which the mobile station requests an MPSO. The system includes a data acquisition device for acquiring service option capability data from the mobile station by the infrastructure during call setup. Memory is provided for storing at least one BSPSO, preferably in the base station. A service option comparison device, preferably located at the base station, compares the MPSO to the BSPSO. Upon outputting a FALSE non-identical result in the service option comparison device, a compatibility testing device compares the BSPSO to the mobile station service option capability to verify that the mobile station is capable of service according to the BSPSO. Assuming a positive result, a connection message device, preferably located at the base station, sends a service connection message to the mobile station to initiate service according to the BSPSO. A message-receiving device, also preferably located at the base station, awaits reception of a message from the mobile station indicating that service connection according to the BSPSO is complete. Thereafter, the base station and mobile station of the system communicate with one another according to the BSPSO invoked. An optional transmitting device at the base station transmits notification to the remainder of the infrastructure that toggling of service assignment has been completed. Throughout the toggling procedure, the same call type (e.g., voice, fax or data) is maintained. If comparison results indicate that the mobile station is not capable of service according to the first selected BSPSO, a retrieving device, preferably located at the base station, retrieves a second BSPSO which is supplied to the system in the manner indicated above so as to process the currently selected BSPSO.

With the present invention, a variety of problems associated with call setup and during the calls themselves are avoided and customers are more likely assured of maximized performance through internal procedures which are transparent to the customer.

While the foregoing described embodiments have been set forth above, it will be appreciated to one skilled in the art that the inventions described have applications beyond the described embodiments. Accordingly, it is intended that the scope of the invention including such alternatives, modifications, and variations contemplated shall be defined by the appended claims.

What is claimed is:

1. A method of toggling service option assignments in a wireless communication system, comprising:

storing at least one Base Station Preferred Service Option in a base station;

receiving a request from a mobile station at the base station to set up a Mobile Preferred Service Option;

transmitting service option capability data from the mobile station to the base station;

establishing a wireless connection between the base station and the mobile station over a radio communication channel implementing the Mobile Preferred Service Option;

comparing the Mobile Preferred Service Option to the Base Station Preferred Service Option in the base station; and verifying at the base station the mobile station capability of service according to the Base Station Preferred Service Option while communication is occurring over the established radio communication channel, wherein the Base Station and Mobile Station Preferred Service Options are different, generating a FALSE, non-identical result due to the comparison between the Preferred Service Options, and implementing the Base Station Preferred Service Option upon verification of the mobile station's capability of service in accordance therewith.

2. A method as recited in claim 1, comprising:

sending a service connection message from the base station to the mobile station to initiate service according to the Base Station Preferred Service Option; and receiving a responsive message at the base station from the mobile station indicating that service connection according to the Base Station Preferred Service Option is complete, the base station and the mobile station thereafter communicating with one another in accordance with the toggling of service option assignment implementing the Base Station Preferred Service Option.

3. A method as recited in claim 1, comprising transmitting from the base station, notification of the toggling of service option assignment to the remainder of the infrastructure.

4. A method as recited in claim 1, wherein the Mobile Preferred Service Option requests service for a preselected call type including at least one of voice, fax, and data with the Base Station Preferred Service Option being directed to the same call type.

5. A method as recited in claim 4, wherein information conveyed via the communication channel is processed by a device implementing either fax, data or voice coding and decoding.

6. A method as recited in claim 1, wherein the communication system is compatible with a code division multiple access (CDMA) cellular or personal communication system.

7. A method as recited in claim 1, further comprising providing a system controller in communication with the base station, sending the at least one Base Station Preferred Service Option in the controller to the base station for being stored in the base station.

8. A method as recited in claim 7, wherein the sending of the at least one Base Station Preferred Service Option from the system controller to the base station is in response to either a request external to infrastructure equipment or a request internal to the infrastructure equipment.

9. A method of toggling service option assignments in a wireless communication system, comprising:

storing at least one Base Station Preferred Service Option in a base station;

receiving a request from a mobile station at the base station to set up a Mobile Preferred Service Option;

transmitting service option capability data from the mobile station to the base station;

establishing a wireless connection between the base station and the mobile station over a radio communication channel implementing the Mobile Preferred Service Option;

comparing the Mobile Preferred Service Option to the Base Station Preferred Service Option in the base station; and verifying at the base station the mobile station capability of service according to the Base Station Preferred Service Option while communication is occurring over the established radio communication channel, wherein upon the verifying of the Base Station Preferred Service Option to the mobile station service option capability yields a result indicating that the mobile station is not capable of service according to the Base Station Preferred Service Option, further comprising:

retrieving a second Base Station Preferred Service Option stored at the base station;

verifying at the base station the mobile station capability of service according to the second Base Station Preferred Service Option;

sending a service connection message from the base station to the mobile station to initiate service according to the second Base Station Preferred Service Option; and receiving a responsive message at the base station from the mobile station indicating that service connection according to the second Base Station Preferred Service Option is complete, the base station and the mobile station thereafter communicating with one another according to the second Base Station Preferred Service Option.

10. A system for toggling service option assignments in a wireless communication infrastructure including a base station in communication with a mobile station via at least one radio communication channel, the system comprising:
- a data acquisition device for acquiring service option capability data from the mobile station by the infrastructure during call setup;
- a memory for storing at least one Base Station Preferred Service Option in the base station;
- service option comparison device at the base station for comparing a received Mobile Preferred Service Option to the Base Station Preferred Service Option in response to call setup being established between said base and said mobile station pursuant to the Mobile Preferred Service Option requested by the mobile station; and
- a compatibility testing device at the base station that in response to a determination of a FALSE, non-identical result in said service option comparison device, compares the Base Station Preferred Service Option to the mobile station service option capability to verify that the mobile station is capable of service according to the Base Station Preferred Service Option.

11. A system as recited in claim 10, comprising:
- a connection message device at the base station for sending a service connection message to the mobile station to initiate service according to the Base Station Preferred Service Option in response to receiving said verification from the compatibility testing device; and
- a message receiving device at the base station receiving a message from the mobile station which is responsive to said service connection message, indicating that service connection according to the Base Station Preferred Service Option is complete, whereby the base station and the mobile station thereafter communicate with one another according to the Base Station Preferred Service Option.

12. A system as recited in claim 10, wherein the infrastructure is in communication with a public switched telephone network to establish a call therewith, the system being operative to toggle service option assignments between said base and said mobile stations while the call is in a steady/conversation state.

13. A system as recited in claim 12, further comprising a transmitting device at the base station for transmitting notification of the toggling of service assignment to the remainder of the infrastructure.

14. A system as recited in claim 10, wherein the mobile station Mobile Preferred Service Option requests service for a preselected call type including at least one of voice, fax, and data with the Base Station Preferred Service Option being directed to the same call type.

15. A system as recited in claim 14, further comprising a transcoder device responsive to the communication channel so that information conveyed is transcoded by said transcoder device so as to implement either fax, data, or voice coding and decoding.

16. A system as recited in claim 10, further comprising a retrieving device which in response to a lack of said verification from said compatibility testing device indicating that the mobile station is not capable of service according to the Base Station Preferred Service Option retrieves a second Base Station Preferred Service Option stored in the base station memory and upon receiving a verification from the compatibility testing device sends a service connection message from the base station to the mobile station to initiate service according to the second Base Station Preferred Service Option.

17. A system as recited in claim 10, wherein the communication system is compatible with a code division multiple access (CDMA) cellular or personal communication system.

18. A system as recited in claim 10, comprising a system controller within the infrastructure in communication with the base station for sending said at least one Base Station Preferred Service Option to the base station.

\* \* \* \* \*